(12) United States Patent
Janovskiy

(10) Patent No.: US 9,338,275 B2
(45) Date of Patent: May 10, 2016

(54) TERMINAL NETWORK FOR WIRELESS VOICE COMMUNICATION

(71) Applicant: Igor' Vladimirovich Janovskiy, Krasnojarsk (RU)

(72) Inventor: Igor' Vladimirovich Janovskiy, Krasnojarsk (RU)

( * ) Notice: Subject to any disclaimer, the term of this patent is extended or adjusted under 35 U.S.C. 154(b) by 0 days.

(21) Appl. No.: 14/394,123

(22) PCT Filed: Jan. 30, 2013

(86) PCT No.: PCT/RU2013/000062
§ 371 (c)(1),
(2) Date: Oct. 13, 2014

(87) PCT Pub. No.: WO2013/162414
PCT Pub. Date: Oct. 31, 2013

(65) Prior Publication Data
US 2015/0072724 A1 Mar. 12, 2015

(30) Foreign Application Priority Data
Apr. 23, 2012 (RU) .................... 2012116392

(51) Int. Cl.
*H04M 1/725* (2006.01)
*H04B 7/00* (2006.01)
*H04B 1/48* (2006.01)
(Continued)

(52) U.S. Cl.
CPC ............. *H04M 1/725* (2013.01); *H04B 1/3827* (2013.01); *H04B 1/48* (2013.01); *H04B 7/00* (2013.01); *H04M 1/72522* (2013.01); *H04W 8/22* (2013.01); *H04M 1/6033* (2013.01); *H04M 2250/12* (2013.01)

(58) Field of Classification Search
CPC .......... H04B 1/3827; H04B 1/48; H04B 7/00; H04M 1/72522; H04W 8/22
USPC .............................. 455/550, 554.1, 554.2, 555
See application file for complete search history.

(56) References Cited

U.S. PATENT DOCUMENTS

2004/0202188 A1* 10/2004 Hou .................... H04L 12/5695
370/401
2004/0228029 A1* 11/2004 Saliba .................... G11B 5/102
360/122

(Continued)

FOREIGN PATENT DOCUMENTS

RU 2394386 C2 7/2010
RU 2423708 C1 10/2011

(Continued)

*Primary Examiner* — Siu Lee
(74) *Attorney, Agent, or Firm* — Nadya Reingand

(57) ABSTRACT

The solution relates to the field of wireless communications. It provides the possibility of transmitting voice data over existing wireless networks via a terminal for wireless voice communication to other similar devices or groups thereof and/or hardware and software systems combined therewith immediately after the occurrence of a transmission activation event, thus the range of technical means for online voice communication extends. The terminal comprises a wireless communication device and a module for monitoring transmission activation events, which device and module are connected to a control module, is designed to be capable, of reacting to a transmission activation event in respect of the transmission of digitized voice data to other similar devices or to groups thereof and/or hardware and software systems combined therewith once a transmission activation event has taken place. Furthermore, the transport medium used comprises wired and/or wireless data transmission networks.

12 Claims, 4 Drawing Sheets

(51) Int. Cl.
*H04B 1/3827* (2015.01)
*H04W 8/22* (2009.01)
*H04M 1/60* (2006.01)

(56) References Cited

U.S. PATENT DOCUMENTS

2007/0032225 A1* 2/2007 Konicek ............ H04M 1/72513
 455/417

2009/0254351 A1* 10/2009 Shin ........................ G06F 3/167
 704/275
2011/0274033 A1* 11/2011 Deng .................. H04L 65/1069
 370/328

FOREIGN PATENT DOCUMENTS

| WO | 2007/025910 | A1 | 3/2007 |
| WO | 2007/111941 | A2 | 10/2007 |

* cited by examiner

TERMINAL FOR WIRELESS VOICE COMMUNICATION

TERMINAL NETWORK FOR WIRELESS VOICE COMMUNICATION

The current application claims priority to PCT application No. PCT/RU2013/000062 filed on Jan. 30, 2013, which claims priority to Russian application No. RU 2012116392 filed on Apr. 23, 2012.

The present invention relates to the field of wireless voice communications that use the transport medium of a local and/or global wired and/or wireless data networks.

In terms of purpose, the most known device for the voice information transmitting to other similar devices via radiowaves is the radio frequency transceiver (two-way radio). Generally it comprises a low frequency unit, a modulator, a demodulator, a high-frequency transmitter, a high-frequency receiver. It transmits the voice information to other similar devices and receives the voice information. There are a variety of radios—from simple one-channel ones to complex multi-band structures (Lapovok Y. S. I build HF radio. 2nd ed., rev. and augmented.—M.: Patriot, 1992, ISBN 5-7030-0410-1). All these devices are based on the principles founded in the early developments of N. Tesla (U.S. Pat. No. 645,576, publ. Mar. 20, 1900; U.S. Pat. No. 649,621, publ. May 15, 1900).

The most common in civilian systems of mobile communications is the simplex radio station operating at a certain frequency within the VHF/UHF band propagating in the line of sight. Such transceivers communicate with each other or with the base radio station directly, or, more rarely, through a repeater.

The disadvantages of this technical solution are the following: limited communication range, need for a powerful inefficient RF amplifiers, bulky antennas, the strong dependence of the signal quality (down to complete fading) on terrain, obstacles, interference, distance from a correspondent, as well as inability to receive a signal of correspondent during transmission of its own signal. In addition, such systems tend to irrational using of frequency resources, since one transmitting radio completely occupies (blocks) a frequency channel during transmission.

More recent developments, some part of which is applied in practice, theoretically can reduce some adverse effects. In particular, the known radio (RU 2225673C2, publ. Mar. 10, 2004) provides full-duplex operation at the same frequency. Also known method and system that interrupts subscriber transmitting in a wireless communication system (RU 2418392S2, publ. May 10, 2011). This solution require, however, the presence of the second channel for signaling, and therefore complicates the circuit.

Despite these shortcomings, a radio is used in the field of communication very widely due to two distinctive properties. The first one is broadcasting. Thanks to this, all similarly configured devices in the zone of connection are simultaneously listening to transmitting station in real time. The second feature is an ease of use and a minimum of controls used in the communication process. This confirms the demand of such functionality for communication device.

Structure of wireless cellular network is a more suitable technical solution for eliminating some technical issues, which relate to radiowaves fading. It allow to optimize the using of frequency channels and to spread uninterrupted communication range with handover method (U.S. Pat. No. 4,670,899, publ. Jun. 2, 1987; U.S. Pat. No. 6,269,087, publ. Jul. 31, 2001; U.S. Pat. No. 4,903,325, publ. Feb. 20, 1990). Modern device like the dual-mode mobile terminal with dual redundant (RU 2434367 C2, publ. Nov. 20, 2011) is able to operate in different modes of digital networks, such as GSM and WCDMA.

The disadvantage of the above technical solutions and devices designed for use in cellular networks is the fact that voice is transmitted between two (at least, a few) subscribers in session mode (connection—conversation—disconnection). The time for establishing the connection for each session can vary from hundreds of milliseconds to several seconds. Furthermore, the known devices of this type transmit a voice information all the time when the connection is on, because they not comprise a module for tracking the events that could stop and resume the transmission of voice information as necessary. Thus, these devices are not suitable for using in the field where Land Mobile Radio (LMR) commonly used (constant and instantaneous communication with other users in a group or with a group manager).

Some combined devices are known that can be used alternately as a radio station with a limited range, and as a mobile phone (WO/2006/097783, published Sep. 21, 2006; RU 2280961C2 published Jul. 27, 2006; RU 2351074C2, publ. Mar. 27, 2009). However, in fact, these solutions represent two dissimilar devices, combined in a common housing. Accordingly, above mentioned disadvantages are peculiar to them as well.

Accordingly, the object of the present invention is to address the above noted disadvantages and other problems of known devices.

Another object of the present invention is to provide a mobile (transportable) terminal and corresponding method that enables a possibility of transmitting voice data over existing wireless networks via the terminal to other similar devices or groups thereof and/or hardware and software systems combined therewith immediately after the occurrence of activation event, thus the range of technical means for online voice communication is extended.

To achieve these technical results, the present invention provides the terminal for wireless voice communication that includes a housing, an external or built-in microphone, a power supply source, a loudspeaker, an electronic control module based on a microprocessor or micro-controller; the specified terminal is characterized in that it comprises a wireless communication device that is connected to the control module with capable of exchanging information with it, an event monitoring module for transmission activation configured to generate control signals to activate and deactivate voice transmission based on the state of associated control(s) and sensor(s) arranged to respond to external event, where an electronic circuit connected to the control module to transmit these control signals, herewith the terminal is adapted to respond to an event with activating the transmission of digitized voice information.

Moreover, the terminal can be configured to react to an event activating the transmission of digitized speech information, wherein the event is defined by the user control command and/or control signal from another device.

Moreover, the terminal can be configured to react to an event activating the transmission of digitized speech information, wherein the event is the appearance of a sound with certain characteristics within a zone of its microphone and/or changing the orientation of the terminal in the space.

In addition, the terminal may include an interface for connection with other audio devices or stations (transceivers) for relaying the signal.

In addition, the terminal may include an interface for communication with other electronic devices to manage them and retrieve information about their condition.

In addition, the terminal may include a radio unit (transceiver).

In addition, the terminal may include hardware for inputting, transmitting, receiving, and displaying text and/or graphics and/or video data and/or data files.

In addition, the terminal may include a system for determining spatial position enabling to transmit information about the terminal to other devices with which the cooperation is carried out.

A wireless voice communication system comprises at least one wireless communication network and at least two terminals for wireless voice communication.

BRIEF DESCRIPTION OF THE DRAWINGS

The features and nature of the invention is illustrated by following drawings.

Reference will now be made in detail to the embodiments of the present invention, in combination with the accompanying drawings.

Figure 1:
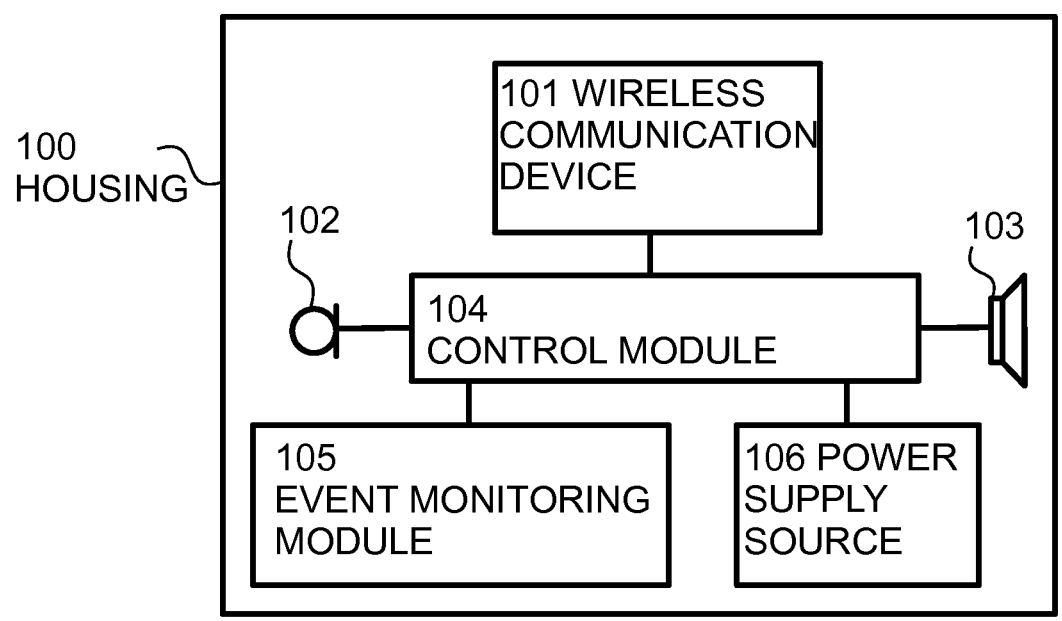
FIG. 1 is a block diagram of modules of the terminal.

FIG. 1 is a block diagram of modules of the terminal, in its most general form. As shown, the terminal includes a housing 100, an external or built-in microphone 102, speaker 103, a power supply source 106, a control module 104 (electronic circuit based on microprocessor), a wireless communication device 101, an event monitoring module for activation voice transmission 105.

The housing 100 is the basis for placement of internal components of the device. It protects them from damage and provides ease of use. Controls of the terminal are placed on the housing, at least some of them: an on-off button, a volume control, a status indicators, a connectors for external devices. Button that activates a transmission also can be on the housing.

An external or built-in microphone 102 converts sound waves into electrical audio frequency vibrations for further processing. Structurally, the microphone may be placed inside the device housing or outside the housing and connected to the electronic circuit of a control module 104 directly with a cable or via wireless technology. If an embodiment provides external microphone, the button that activates a transmission may be posted on the microphone unit for ease of use. Microphone may be, for example, a MEMS microphone model MP45DT01, having a one-bit PDM output.

A speaker 103 for reproducing the audio information addressed to the user may be located in the device housing or outside the housing and be connected to the electronic circuit of a control module directly or via wireless technology.

A power supply source 106 is arranged in the terminal housing and provides power to the electronic circuit of a control module, a wireless communication device and, if necessary, to additional modules and external devices. The power source may be presented as a battery (batteries) or an electronic circuit that receives power from an external source.

A control module 104 based on microprocessor operates the device. It performs sound processing, controls status polling, stores settings, changes an indicators state. It prepares data packets for transmission via wireless communication device, and process an information received from the network. It checks the condition of the transmission activation and coordinates data transmission with signals received from an event monitoring module.

A control module can be implemented, for example, on the basis of microassembly BCM2835, which includes a microcontroller, PCM/I2S audio interface, as well as ports and interfaces for connecting peripheral devices and modules. Module performs the above functions by a predetermined recorded instruction set, the general principle of which is reflected in the flow chart (see FIG. 2) and is described in details below. Furthermore, a control module may include a digital-to-analog converter (DAC) and an amplifier of low frequency (VLF), implemented, for example, with chip CS43L22, which input is connected to the microassembly BCM2835 via interface I2S, and output is connected directly to loudspeaker. In addition, a control module may include an audio processor that performs ADC/DAC functions and hardware codec for full-duplex mode, for example, based on the chip with low power consumption VS1063, having a microphone and line inputs and connected to the microassembly BCM2835 through interface I2S and/or UART.

Furthermore, a control module may include a storage device (memory). Memory acts as a storage device for terminal configuration when power is off, and is also used in the process as a buffer to store audio data. As a storage device, for example, SD card can be used, with connection to the microassembly through an available therein interface EMMC.

A wireless communication device 101, which is connected to the control module 104, exchanges information with other devices via the network and may, depending on embodiment, operate in any of the digital networking standards: IEEE 802.11 (Wi-Fi), 802.16 (WiMax), GSM/GPRS (2G), IMT-2000 (3G), LTE (4G), and the others providing data transmission rate 64 kbps or more. A wireless communication device may, for example, comprise the following components: microassembly SQN1280 (IEEE 802.16), connected to the control module via the SPI interface; microassembly SIM5320E (2G/3G), connected to the control module via the USB interface; microassembly SQN3140 (LTE), connected to the control module via the SPI interface. Furthermore, some electronic components designed for a few standards are currently available, which supports multiple networks simultaneously or in succession, for example, microchip BCM2091 that works in 850/900/1800/1900/2100 MHz bands.

A wireless communication device is separated from the main electronic circuit the way that allows replace the module easily to fit national standards in the field of telecommunications and local conditions. This approach also improves maintainability and simplifies setup of terminals. At the same time structurally wireless communication device 101 can be positioned either on the same circuit board as the main electronic circuit or separately.

An event monitoring module for transmission activation 105 is an electronic circuit that is connected to the control module 104 with the ability to exchange information with it via UART interface. Structurally, an event monitoring module can be located either on the same PCB as the main electronic circuit or separately. The module monitors the status of sensors and controls, as well as an event signals from devices connected to the module. The module is configured to generate and send control signals to the control module 104 in purpose to activate and deactivate voice transmission, when a certain event is occurred.

Event for transmission activation may be, for example, user manipulation or control command, a control signal from another device coupled with the terminal, appearance of a sound with certain characteristics within a zone of terminal microphone and/or changing the orientation of the terminal in the space.

An additional function of an event monitoring module 105 may be, for example, tracking the status of the electronic device connected to the terminal via the interface, the transmission of information about its status to the control module 104, and switching of audio inputs and outputs.

An event monitoring module may be implemented, for instance, on the basis of microchip STM32F100C, which contains the USART, I2C, SPI, CEC interfaces for connecting peripheral devices and modules, ports, GPIO, as well as multichannel digital-to-analog converter (DAC) and analog-to-digital converter (ADC). An event monitoring module may include a set of controls (buttons and/or micro-switches that are connected to the separated pins of GPIO of microchip STM32F100C). An event monitoring module may also include indicators (LEDs connected to a separated pins of GPIO of microchip STM32F100C).

Another possible embodiment of the terminal may be capable of switching of audio inputs and outputs between the terminal itself and an external device connected thereto via an interface. In this case an event monitoring module may include discrete switching elements, such as relays and transistors controlled through GPIO port of microchip STM32F100C. This can be applied also in the case of the implementation of the invention, where the terminal includes a radio frequency transceiver.

If the embodiment of the terminal does not provide an opportunity of connection to a large number of sensors and indicators, an event monitoring module may be implemented, for instance, on the basis of microchip or micro-controller with fewer ports and interfaces.

Figure 3:
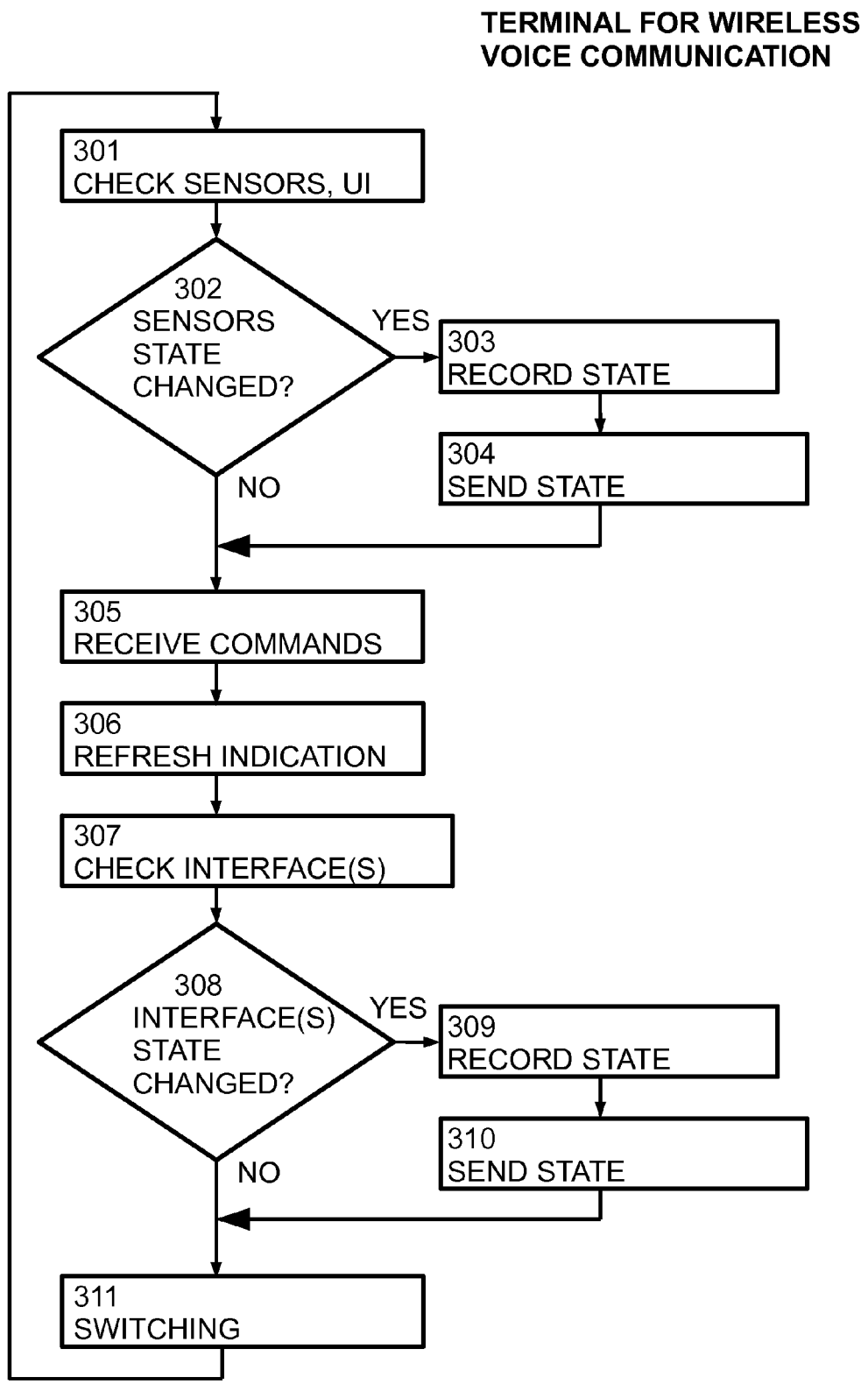
FIG. 3 is a flow chart illustrating a method of operation of the event monitoring module.

An event monitoring module executes the above functions by a predetermined set of firmware instructions, a general principle of which is reflected in the flow chart (see. FIG. 3) and is described in detail below.

To provide additional functionality the terminal can be supplemented with the following components:
1) an accelerometer or position sensor, if the event of activation is a change of the terminal orientation in space;
2) an interface(s) in the form of ports and connectors to communicate with other electronic devices and/or with external audio devices;
3) a single-mode or multi-mode optional modem (or network adapter) to provide additional networking standard, or for the operation within more than one network (group);
4) a display for text and/or graphics and/or video data (optionally capable for input);
5) a keyboard for writing text and/or for input graphic data;
6) a video camera for transferring photos and/or video data;
7) a radio frequency transceiver for direct connection to similar devices without using any data transfer network or in case of unavailability of a data transfer network. In this implementation the terminal includes means of manual (including remote) or automatic selection of one of the operating modes of the terminal—using only the data transfer network, using only the transceiver, or in combination;
8) a system for determining the position.

Spatial positioning sensor may be implemented, for example, on the basis of microchip MMA7455L, connected to microchip STM32F100C via SPI. Interface for interaction with other electronic devices or audio devices may be implemented, for example, in the form of the multi-pin connector (connectors), some of the pins of which are connected to separate terminals of GPIO port of microchip STM32F100C. As an additional single-mode or multi-mode modem (or network adapter), any commercially manufactured device that is connected to the microprocessor interface through the USB may be used, for example. As the display, one of the modules such as MT12232 or WG12232E-TML, connected to the microprocessor of the BCM2835 through the GPIO port pins, or module PCD8544, connected to STM32F100C via SPI interface may be used, for example. The keyboard of the terminal may be realized, for example, as a set of buttons or micro-switches that are connected to a separate port GPIO pins of event monitoring module 105 or control module 104 in another possible embodiment.

Positioning system may be implemented, for example, on the basis of the module STA8088F, connected to the microprocessor BCM2835 via the I2C interface and providing signal reception system for GLONASS, GPS, Galileo, QZSS.

The best embodiment of an invention may include all of these additional components for the realization of maximum functionality.

Figure 2:
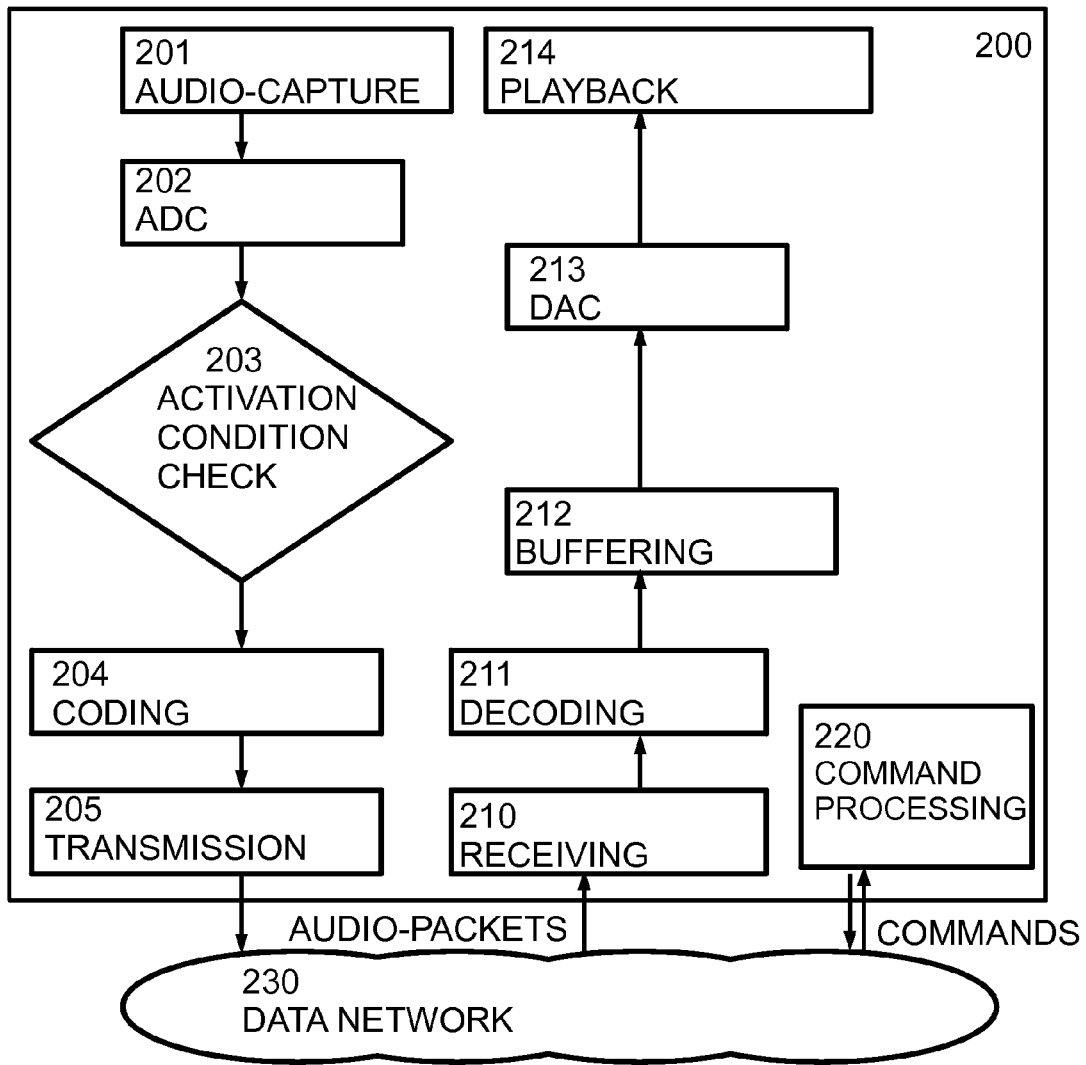
FIG. 2 is a flow chart illustrating a method of operation of the terminal.

FIG. 2 is a flow chart illustrating a method of operation of the terminal.

It is assumed that the terminal is enabled beforehand, and is connected to the data network 230 at a preliminary stage. In the above described embodiment of the invention, microprocessor of the control module reads parameter table from SD memory through an existing therein EMMC interface. The table contains parameters for at least one network address of another instance of a terminal which is supposed to exchange the audio data (hereinafter such terminals are referred to as compatible) and/or subnet address for transmitting information to an indefinite range of devices connected to it.

A data for sound volume, the list of events that enables the transfer of voice information, the frame size, other service information required for the operation of the device also can be stored in the table of parameters.

In another embodiment, the parameter table of the terminal can contain an address of the server that contains a table of parameters. In this case, the parameters are read from the server and thus may be changed centrally by administrator. Preliminary stage may also include an identification of the status of compatible terminal devices (correspondents), which are available or unavailable for interaction.

Electronic circuit of the control module conducts audio capture (Block 201) constantly so that the sound from microphone is broken into audio fragments (frames) of fixed duration and then analog audio frames are converted into digital frames (Block 202). Analog-to-digital conversion may be performed directly in the microphone having a one-bit PDM output. In another embodiment of the invention in the case of using the analog microphone, an analog-to-digital conversion may be performed, for example, in the event monitoring module 105, which contains multichannel digital-to-analog converter (DAC) and analog-to-digital converter (ADC) or in an audio processor.

Digital audio stream goes to the BCM2835 microprocessor PCM subsystem and is stored in a buffer. After accumulation of data amount corresponding to the set frame size (eg, 20 ms or 160 samples), frame is copied into the RAM of the microprocessor using the DMA subsystem, and the buffer is released.

Then the activation condition check is performed (Block 203). Such a condition may be an action of the user (for example, clicking on a button), a signal from remote terminal, the state of position sensor(s).

As described above, an event monitoring module 105 monitors the state of sensor(s) and of interface(s) (see details at FIG. 3) and transmits the status information to the control module 104. Firmware of an event monitoring module compares the information about the state of the sensor(s) with a predetermined list of events that must enable the transmission of speech information. In case of coincidence, the frame of audio data is transmitted via the wireless communication device 101 and data network to the compatible terminals, address(es) of which are contained in the parameter table.

Also, the appearance of a sound with certain characteristics (amplitude, frequency or spectrum) within a zone of its microphone may serve as event for transmission activation, so audio capturing acts all the time. In this case, the firmware of the control module analyzes the frame, received in memory buffer. This may be accomplished, for example, by calculating the average value of samples constituting a frame. If the average value of samples greatly exceeds the background level, this means that the sound has sufficient amplitude for transmission. If an activation condition is satisfied, coding of frame buffer occurs (Block 204). Modern data networks do not impose significant restrictions on the amount of information transmitted. In the illustrated embodiment of the invention, frame compression, or additional processing is not made; the audio data is transmitted without loss of quality. Here coding means the formation of a data packet consisting of the command itself and the unprocessed frame. Thus formed packet is transmitted directly to the network (Block 205). This simplifies the algorithm of the microprocessor and reduces its power consumption, which has a positive impact on the battery life of the terminal.

According to some embodiments, the encoding step (Block 204) comprises preprocessing of frames with a codec in order to transfer a smaller volume of audio data to the destination device(s). For instance, the codec ITU-T G.722, standardized by the International Telecommunication Union, may be used for this purpose. This codec uses sampling frequency 16 kHz, which is consistent with the capabilities of the microprocessor BCM2835 of the control module. Also other well-known codecs may be used for encoding, such as open source codec Speex, which uses a variable sampling frequency and the frame size 30 ms.

In another embodiment, a hardware codec may be used, such as audio processor based on the chip VS1063, which may be connected to the microprocessor BCM2835 via interface I2S as a part of the control module. In this case, the analog audio signal from the microphone or line input goes to the input terminal MICP of audio processor, then passes through an integrated mixer into integrated ADC to be encoded in the VSPSP4 core. Encoded frames are sent to the main processor BCM2835, which finally form a data packet to be transmitted.

Receiving data from the network (Block 210) also occurs continuously in the standby mode. Received data packet, after checking of its integrity, is decoded (Block 211). In the illustrated embodiment, the decoding process includes a parsing the packet received from the network and an allocation of a frame of audio data, suitable for a reverse (digital-to-analog) conversion. In other embodiments, as described above for the encoding process, after parsing a frame undergoes decoding with corresponding codec (ITU-T G.722 or Speex). The decoding process is the inverse of the encoding process. The formed frames are written into the buffer (Block 212) and then are converted from digital to analog form (Block 213), and are played (Block 214).

A buffering enables to delay playback and to repeat playback, if the device user did not hear the information or was absent. Since the processes of receiving data from the network and transmitting the voice information to the network are independent, it is easy to perform duplex operation.

In addition to audio data, the terminal sends to the network and receives from the network a service information on the status of the devices (Block 220) as well as commands, configuration, monitoring and other data necessary for the operation. To provide standby "always on" connection, the terminal at least once at a minute monitors the quality of the connection and reconnects to the data network if connection is failed. If it is impossible to immediately send the data, that packets are stored in the send buffer and can be shipped in the reduction of communication.

The set of commands, the audio transmission packet, the service information on the status of devices, controls and other data all in aggregate forms a special internal communication protocol. However, the direct transfer of data to the network and receive data from the network is performed using standard network protocols TCP and/or UDP. Other network protocols available in a specific data network may be used too.

FIG. 3 is a flow chart illustrating a method of operation of the event monitoring module for transmission activation.

According to some embodiments, the module performs its functions through a given set of firmware commands in the chip STM32F100C. In the general case, the module acts as following. Primarily, the module polls the state of interfaces such as USART, I2C, SPI, CEC, GPIO, which are connected to sensor(s) and terminal control(s) (Block 301). The current status of ports and interfaces is compared with the status word previously recorded in the module memory (Block 302). If there were changes, the new status word is stored in the memory unit (Block 303) as amended, and then the status word is transferred to the control module (Block 304) as a signal to activate the transmission of digitized voice information.

The module then checks the commands from the control module (Block 305), which are transmitted via UART. In accordance with these instructions set, the LEDs statuses are changed (Block 306), through the establishment of appropriate logic level signal at the terminals of the port GPIO. In other embodiments, when, for example, microchip STM32F100C is connected to a display module via the SPI interface, the event monitoring module updates the display by writing data to the interface. Furthermore, in accordance with signals from the control module, the state of the output lines of the external devices interface can be changed.

The module then checks the status of the input lines of an external devices interface(s) (Block 307). The current status of interface(s) is compared with the status word previously recorded in the module memory (Block 308). If there were changes, the new status word is stored in the memory unit (Block 309) as amended, and then the status word is transferred to the control module (Block 304).

According to some embodiments, where the terminal is connected to other audio devices or transceivers, relaying (switching) is performed. In this case, for example, the event monitoring module also changes the state of the GPIO port pins of microchip STM32F100C, which are attached to the discrete switching elements.

This sequence of steps is repeated in the cycle.

Figure 4:
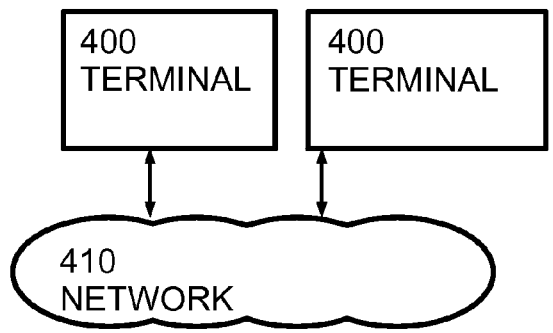
FIG. 4 is a block diagram of an interaction of two instances of the terminal.

FIG. 4 is a block diagram of an interaction of two instances of the terminal according to the simplified embodiment of the present invention. The diagram shows how the terminals 400 and a data network 401 form a system, in which terminals communicate using data network as a transport medium for the transmission of information.

Figure 5:
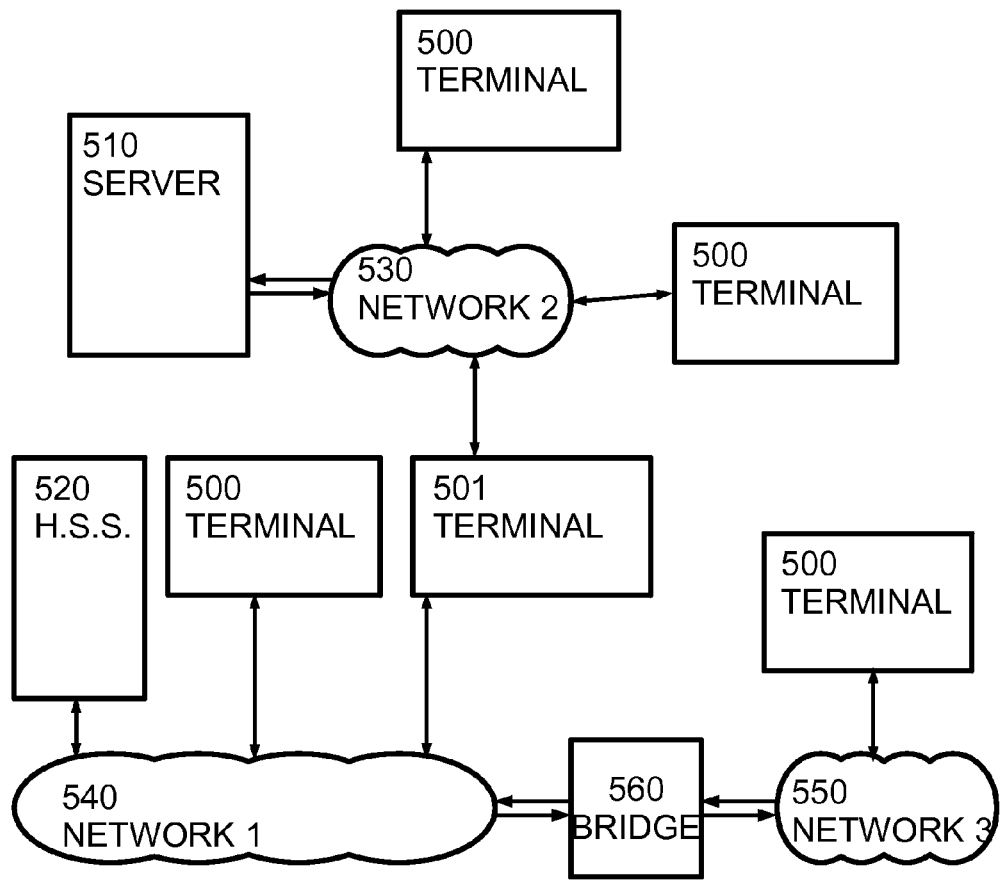
FIG. 5 is a block diagram of interaction of several instances of the terminal.

FIG. 5 is a block diagram of interaction of several instances of the terminal according to the more complex embodiment of the present invention.

The diagram shows how the terminals 500 and the terminal 501 having more than one module to provide the network access, interact in groups, using different data networks 530, 540, 550, including the networks connected by gateway 560, as a medium for the transmission of information. The terminals interacts also with hardware and software system (HSS) 520, which are compatible with the terminals in the sense of the communication protocol. This HSS, for example, may be installed in the dispatch service. In particular, such systems may be used also to produce the most optimal setup and configuration of terminals. The diagram shows that the users have different ways to configure the terminals for operation in the required network(s) and/or group(s). The terminals transmit voice and overhead information to each other directly, using network addresses of terminals, or they transmit this information via the server 510, which may be used as an auxiliary addresses server (e.g., if the terminals have dynamic addresses) or as a full data packets repeater.

The range and quality of communications in such a system, as compared with conventional radio system, are less dependent on the individual characteristics of each device and its location, while the device is still in the coverage area of the one or more data network. Since modern public networks are constantly upgraded in order to reach the maximum number of users in their service area, their operating range is obviously broader than the coverage of traditional CB/VHF/UHF radio.

Thus, users of the proposed invention have an advantages as following:

1) an opportunity of avoiding a need to build and maintain their own infrastructure for operational voice communications;

2) an ability to flexibly configure user groups, even if users are located in different networks;

3) an ability to replace traditional transceivers with the proposed terminals without need of training to use them, because controls and user interface are made simple, similar to radio stations, despite the different working principle;

4) an opportunity to use full-duplex operation, and additional functionality.

The foregoing descriptions are only preferred embodiments of the invention. To those skilled in the art, the present invention may have various changes and variations. Any modifications, equivalent replacements, improvements etc. within the spirit and principle of the present description and claims, all are within the protective scope of the present invention.

The invention is ready to implementation at the present level of development of the technology, both in terms of using the invention for the needs of dispatching and technological communication, and in terms of producing in an industrial scale. All components necessary for the implementation of a invention, are commercially available in the form of discrete elements or finished modules. The capacity of existing wireless networks is sufficient for the operation of the invention. Need for a means of operational wireless devices is confirmed by the fact that the industry produces serially the tens of names of radio transceivers that have a similar purpose and are widely used in the fields of processing and dispatching communications in industry, as well as in the transportation, public utilities and in the service sector.

What is claimed is:

1. A terminal network for wireless voice communication, comprising:
   a first terminal having a microphone,
   an electronic control module,
   a wireless communication device that is connected to the control module,
   an event monitoring module for transmission activation representing an electronic circuit based on an event microprocessor or an event microcontroller, configured to generate control signals to activate and deactivate a voice transmission based on a state of associated controls and sensors adapted to respond to an external event, the first terminal being connected to at least a second and a third terminals via a wireless network, the first terminal sending simultaneously voice packets to at least the second and the third terminals using network addresses of the terminals,
   wherein the electronic circuit connected to the electronic control module has the ability to transmit the control signals, thus the first terminal is adapted to respond to an event by activating a transmission of a digitized voice information.

2. The terminal network for wireless voice communication of claim 1, characterized in that the sensor connected to the electronic circuit of the event monitoring module for the transmission activation is configured to respond by changing its status to the external event, where the external event is a defined control command of a user and/or a change in the orientation of the first terminal in space.

3. The terminal network for wireless voice communication of claim 1, characterized in that the sensor connected to the electronic circuit of the event monitoring module for the transmission activation is configured to respond by changing its status to the external event, where the external event is an appearance of a sound with certain characteristics within a zone of the microphone of the first terminal.

4. The terminal network for wireless voice communication of claim 1, characterized in that the event monitoring module for the transmission activation is adapted to respond by the formation of control signals of activation/deactivation to the external event, where the external event is a signal from another device connected to the first terminal.

5. The terminal network for wireless voice communication of claim characterized in that it is adapted to connect to other audio devices or to radio stations (transceivers) for relaying of a call.

6. The terminal network for wireless voice communication of claim 1, characterized in that it additionally comprises a radio module (transceiver).

7. The terminal network for wireless voice communication of claim 1, characterized in that it additionally comprises a hardware for inputting, transmitting, receiving, and displaying text and/or graphics and/or video data and/or data files.

8. The terminal network for wireless voice communication of claim 1, characterized in that it additionally comprises a system for determining spatial position enabling it to transmit information about the first terminal to other devices with which a cooperation is carried out.

9. A terminal for wireless voice communication, comprising:
   a microphone;
   an electronic control module;
   the electronic control module receiving an analog signal from the microphone and converting it to a digital frame signal;

a wireless communication device that is connected to the electronic control module, the wireless communication device receiving the digital frame signal from the electronic control module; the wireless communication device transmitting the digital frame signal into a wireless network;

further comprising a sensor transmitting a control signal to an event monitoring module, wherein the event monitoring module sends an event monitoring signal to the electronic control module thus controlling a beginning and an end of the digital frame signal transmission based on the control signal from the sensor, wherein transmission of a first frame is performed immediately after receiving a beginning of the event monitoring signal and the following frames transmission continues as long as the event monitoring signal lasts.

10. The terminal of claim 9, wherein the digital frame length is 20 ms.

11. The terminal of claim 9, wherein the sensor is an accelerometer.

12. The terminal of claim 9, wherein the sensor is a spatial positioning sensor.

\* \* \* \* \*